United States Patent
Allen

(10) Patent No.: US 9,229,186 B2
(45) Date of Patent: Jan. 5, 2016

(54) SELF ENGAGING PORT PLUG

(71) Applicant: TYCO ELECTRONICS CORPORATION, Berwyn, PA (US)

(72) Inventor: Barry Wayne Allen, Siler City, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/180,041

(22) Filed: Feb. 13, 2014

(65) Prior Publication Data

US 2014/0226935 A1 Aug. 14, 2014

Related U.S. Application Data

(60) Provisional application No. 61/764,750, filed on Feb. 14, 2013.

(51) Int. Cl.
*G02B 6/44* (2006.01)
*H02G 15/04* (2006.01)

(52) U.S. Cl.
CPC .............. *G02B 6/4444* (2013.01); *H02G 15/04* (2013.01)

(58) Field of Classification Search
CPC combination set(s) only.
See application file for complete search history.

(56) References Cited

U.S. PATENT DOCUMENTS

| | | | |
|---|---|---|---|
| 5,323,480 A | 6/1994 | Mullaney et al. | |
| 5,446,823 A | 8/1995 | Bingham et al. | |
| 5,775,702 A | 7/1998 | Laeremans et al. | |
| 7,711,236 B2 | 5/2010 | Gonzalez et al. | |
| 7,780,173 B2 | 8/2010 | Mullaney et al. | |
| 8,646,355 B2 | 2/2014 | Lee et al. | |
| 2008/0224419 A1 | 9/2008 | Mullaney et al. | |
| 2013/0294739 A1 | 11/2013 | Allen et al. | |

FOREIGN PATENT DOCUMENTS

| | | |
|---|---|---|
| KR | 20-2012-0007070 U | 10/2012 |
| KR | 10-2012-0133537 | 12/2012 |
| WO | WO 2010/008718 A2 | 1/2010 |

OTHER PUBLICATIONS

International Search Report and Written Opinion for PCT/US2014/016169 mailed Apr. 28, 2014.
Tyco Electronics, FOSC 450, "Fiber Optic Splice Closure Ordering Guide," 26 pp.
Tyco Electronics, FOSC 450 B6 Closure, Installation Instruction, "Fiber Optic Splice Closure," 9 pp.
Tyco Electronics, FOSC 450 A, Installation Instruction, "Fiber Optic Splice Closure," 10 pp.

*Primary Examiner* — Jerry Rahll
(74) *Attorney, Agent, or Firm* — Merchant & Gould P.C.

(57) ABSTRACT

An enclosure that includes an outer housing, a sealant assembly that defines a cable port for routing a cable into the outer housing and a port plug that passes through the cable port. The port plug includes a retention feature that is moveable between an expanded configuration and a radially compressed configuration. The retention feature has an elastic construction that allows the retention feature to move to the radially compressed configuration as the retention feature passes through the cable port and causes the retention feature to automatically expand to the expanded configuration after the retention feature passes through the cable port.

9 Claims, 11 Drawing Sheets

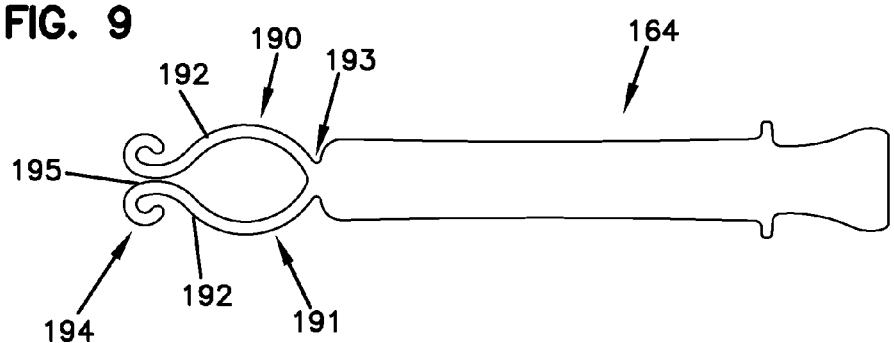
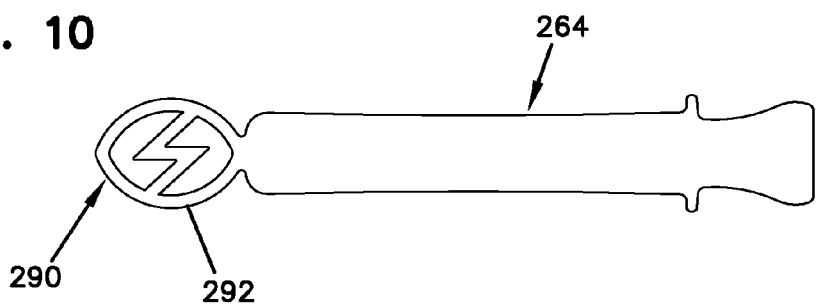
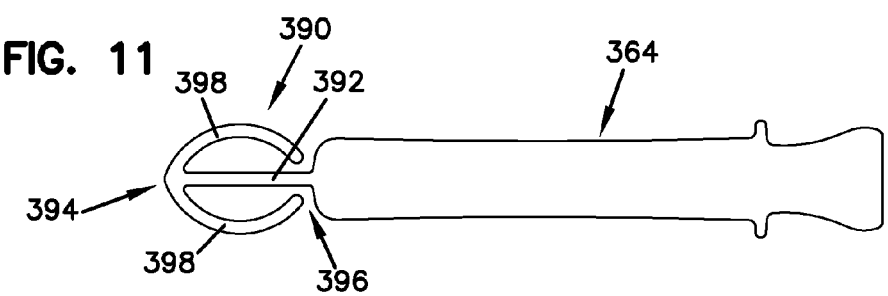
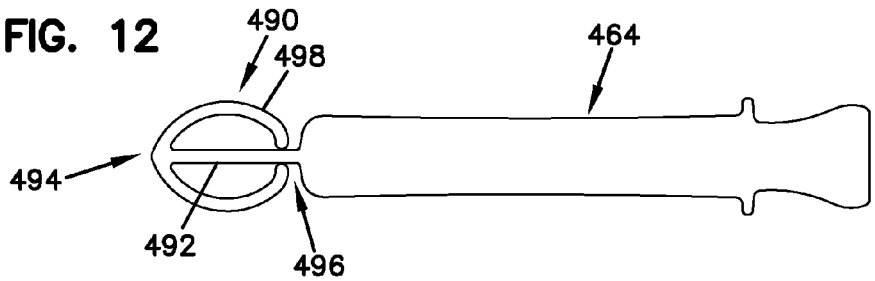
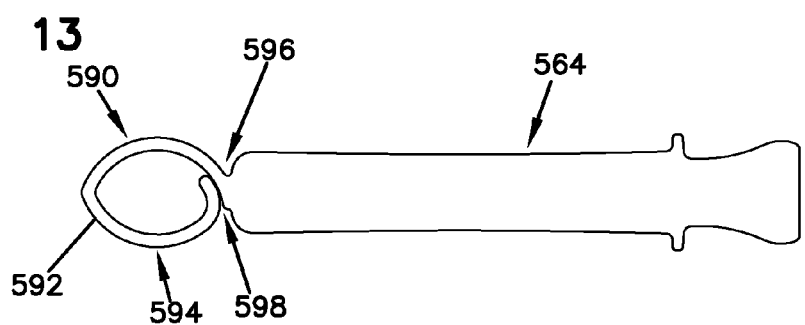

SELF ENGAGING PORT PLUG

CROSS-REFERENCE TO RELATED APPLICATION

The present application claims the benefit of U.S. Provisional Patent Application Ser. No. 61/764,750, filed Feb. 14, 2013, which application is hereby incorporated by reference in its entirety.

TECHNICAL FIELD

The present disclosure relates generally to optical fiber enclosures and related equipment. More particularly, the present disclosure relates to flexible port plugs with retention features such that the port plugs can be added and removed from rigid structures automatically.

BACKGROUND

Fiber optic communication systems are becoming prevalent in part because service providers want to deliver high band width communication capabilities to customers. Fiber optic communication systems often employ a network of fiber optic cables capable of transmitting large volumes of data and voice signals over relatively long distances. A typical fiber optic network includes a system of trunk fiber optic cables each including a relatively large number of optical fibers. Optical fiber networks also include drop cables that interconnect to fibers of the trunk cables at various locations along the lengths of the trunk cables. The drop cables can be routed from the trunk cables to subscriber locations or to intermediate structures such as drop terminals.

Drop cables are often connected to the optical fibers of trunk cables via splices (e.g., fusion splices or mechanical splices). Splices are often supported within splice trays that are protected from the environment by sealed, re-enterable enclosures. Such enclosures typically include sealed ports through which the trunk cables and drop cables enter the enclosures. One example type of enclosure includes a dome and a base that are interconnected by a clamp. A gel block mounts within the base. The gel block defines a plurality of cable ports for allowing cables to be routed into the enclosure through the base. The cable ports are sealed by pressurizing the gel block with a manual actuator. Plugs are mounted within any of the cable ports that are unused. Example dome-style splice closures are disclosed in U.S. Pat. Nos. 7,780,173; 5,446,823; and 5,323,480.

A typical fiber optic cable includes an optical fiber surrounded by a protective outer jacket. The optical fiber typically includes a glass core and cladding surrounded by one or more layers of protective coating. A typical fiber optic cable also includes a structure for reinforcing the cable with respect to tensile and/or compressive loading. For example, strength members, such as epoxy rods reinforced by glass fibers/rovings, can be incorporated into the cable to provide the cable with reinforcement with regard to both compressive and tensile loading. Other types of cables can include a strength layer formed by strength members such as aramid yarn which provide tensile reinforcement to the cables. When a fiber optic cable is routed into an enclosure, the outer jacket of the fiber optic cable is often stripped away to provide access to the internal optical fiber for splicing or connection to a fiber optic connector.

It is a common practice for telecommunication splice enclosures to allow of cables to enter and exit. This is typically done via holes that are called ports. The ports are environmentally sealed to prevent water ingress via heat shrink, gel, rubber, or other encapsulating substance. These ports sometimes require temporary plugs to be used until the port is needed. The present disclosure relates to developing port plugs that can be added or removed from rigid structures without the risk of falling out or self-ejecting from the closures. The port plug has the ability to provide retention features that hold the plug in place and prevents any movement. The port plug is advantageous when dealing with limited spaced envelopes that prevent manipulation on the inside of a closure or dismantling a closure. The port plug can be relatively easy to access for installation or removal.

SUMMARY

One aspect of the present disclosure relates to an enclosure including an outer housing, a sealant assembly that defines a cable port for routing a cable into the outer housing, and a port plug that passes through the cable port. The port plug includes a retention feature that is moveable between an expanded configuration and a radially compressed configuration. The retention feature has an elastic construction that allows the retention feature to move to the radially compressed configuration as the retention feature passes through the cable port and causes the retention feature to automatically expand to the expanded configuration after the retention feature passes through the cable port.

Another aspect of the present disclosure relates to an enclosure having a primary sealant assembly including a primary volume of sealant that defines a plurality of primary cable through-ports that pass through the primary sealant assembly. A secondary cable tube may mount within one of the primary cable through-ports. The secondary cable tube may include a first end and a second end. A secondary cable sealant assembly may include a secondary sealant volume that defines a plurality of secondary cable through-ports that extend through the secondary cable sealant assembly. A port plug that passes through the secondary cable through-ports. The port plug includes a retention feature that is moveable between an expanded configuration and a radially compressed configuration. The retention feature has an elastic construction that allows the retention feature to move to the radially compressed configuration as the retention feature passes through the secondary cable through-ports and causes the retention feature to automatically expand to the expanded configuration after the retention feature passes through the secondary cable through-ports.

Another aspect of the disclosure includes a housing including a dome having an open end and a base that is secured to the open end of the dome. A primary sealant assembly includes a primary volume of sealant that defines a plurality of primary through-ports that pass through the primary sealant assembly. The primary sealant assembly may include a primary actuator for pressurizing the primary volume of sealant.

A secondary cable tube assembly may include a secondary cable tube having a first end and an opposite second end. The first end of the secondary cable tube may be positioned outside the housing when the secondary cable tube may be mounted within the primary cable through-port. The second end of the secondary cable tube may be positioned inside the housing when the secondary cable tube is mounted within the primary cable through-port. A secondary cable sealant assembly may mount within the first end of the secondary cable tube, and a secondary cable anchoring assembly may mounts at the second end of the secondary cable tube. The secondary cable sealant assembly may include a secondary sealant volume that may define a plurality of secondary cable through-ports extending through the secondary cable sealant assembly to provide sealed secondary cable access to the interior of the housing. The secondary cable sealant assembly may also include a secondary actuator for pressurizing the secondary sealant volume. The secondary actuator may include an inner compression plate and an outer compression plate between which the secondary sealing volume is positioned. The enclosure includes a port plug that passes through the secondary cable through-ports. The port plug includes a retention feature that is moveable between an expanded configuration and a radially compressed configuration. The retention feature has an elastic construction that allows the retention feature to move to the radially compressed configuration as the retention feature passes through the secondary cable through-ports and causes the retention feature to automatically expand to the expanded configuration after the retention feature passes through the secondary cable through-ports.

A further aspect of the disclosure includes a port plug including a main body having an internal end and an opposite external end and a head at the internal end. The head may have elastic characteristics such that the head of the port plug compresses when pulled or pushed axially through a secondary cable through-port. The head of the port plug may automatically expand back open due to the elasticity property when removed or fully inserted in the secondary cable through-port. The external end of the port plug has a handle, where the main body of the port plug may be integrated or coupled with the head and the handle to form a unitary piece.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 9 is another embodiment of a port plug in accordance with the principles of the present disclosure;

FIG. 10 is another embodiment of a port plug in accordance with the principles of the present disclosure;

FIG. 11 is another embodiment of a port plug in accordance with the principles of the present disclosure;

FIG. 12 is another embodiment of a port plug in accordance with the principles of the present disclosure; and FIG. 13 is another embodiment of a port plug in accordance with the principles of the present disclosure.

DETAILED DESCRIPTION

Figure 1:
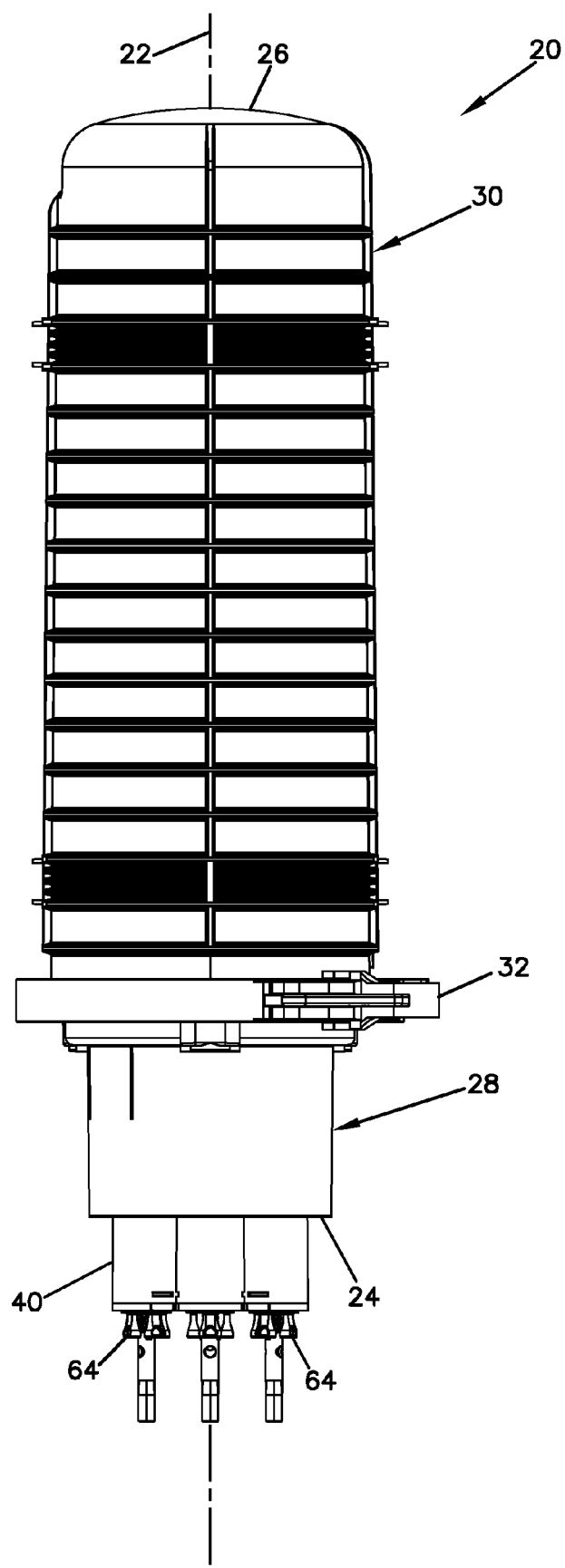
FIG. 1 is a side view of an enclosure in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the inventive aspect disclosed herein.

Figure 2:
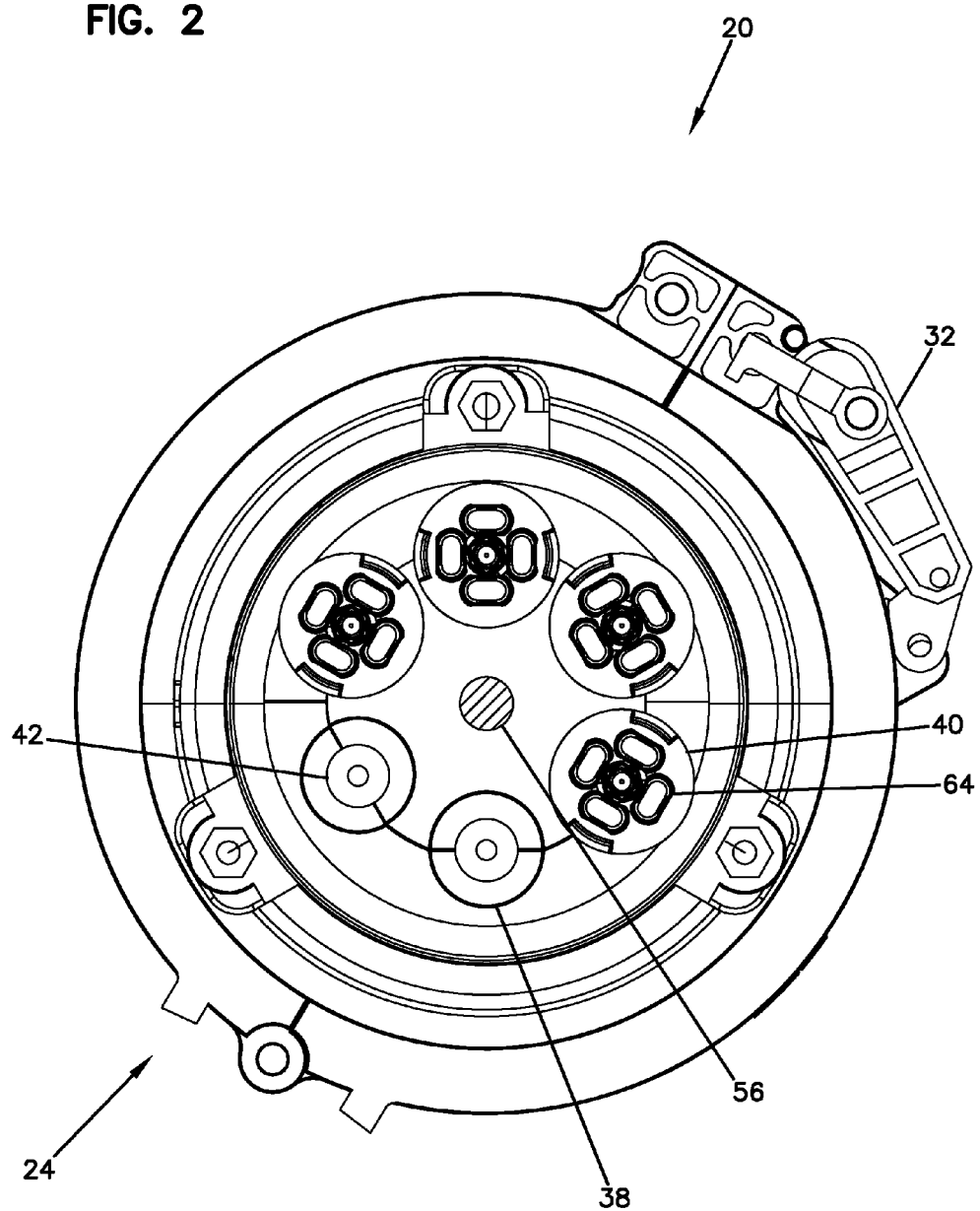
FIG. 2 is a bottom view of the enclosure of FIG. 1.
Figure 3:
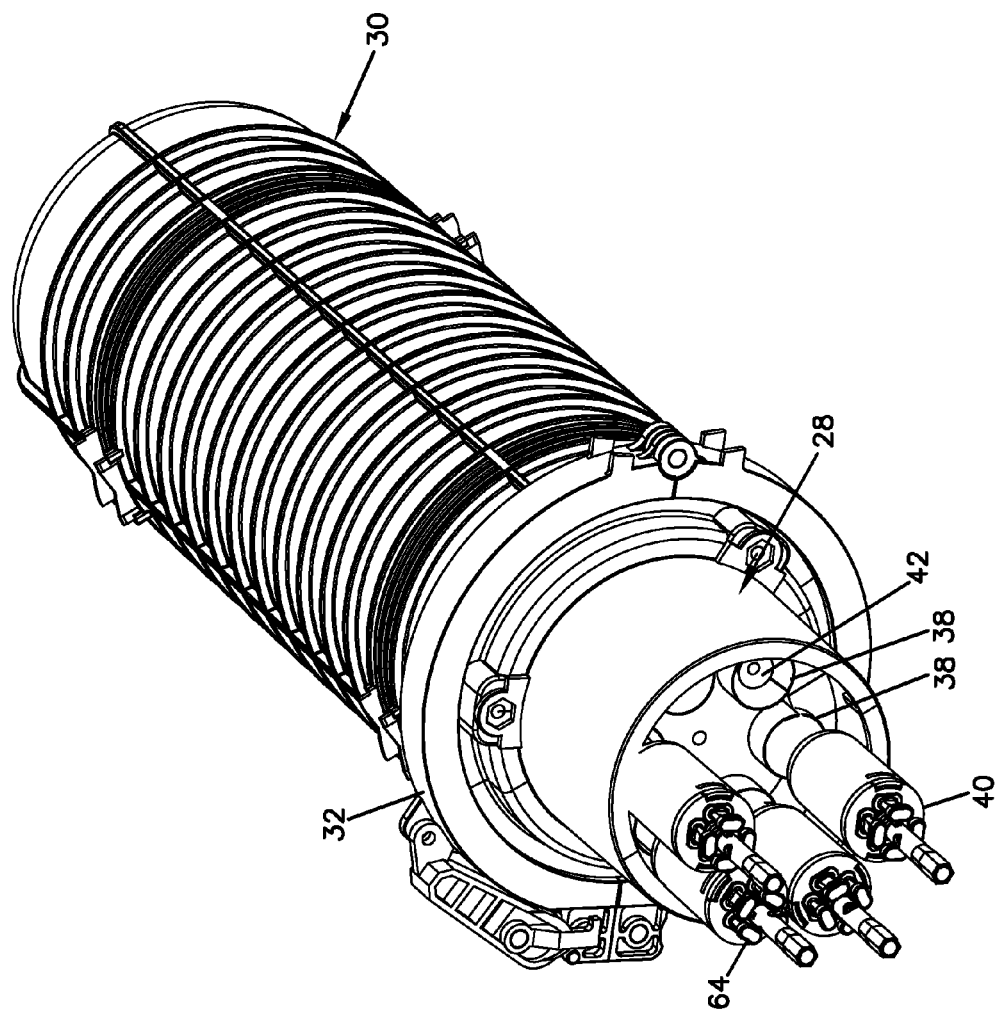
FIG. 3 is a bottom, perspective view of the enclosure of FIG. 1.

FIGS. 1-3 show an enclosure 20 in accordance with the principles of the present disclosure. The enclosure defines a central longitudinal axis 22 that extends along a length of the enclosure 20 from a bottom end 24 to a top end 26. A base 28 defines the bottom end 24 of the enclosure 20 while a dome 30 defines the top end 26 of the enclosure 20. The base 28 and the dome 30 are interconnected by a clamp 32 that mounts over flanges 34, 36 respectively defined by the base 28 and the dome 30 (see FIG. 4). A seal (not shown) can mount between the flanges 34, 36 (see FIG. 4) to provide an environmental seal that prevents moisture, dust and, pests from entering the interior of the enclosure 20.

Figure 4:
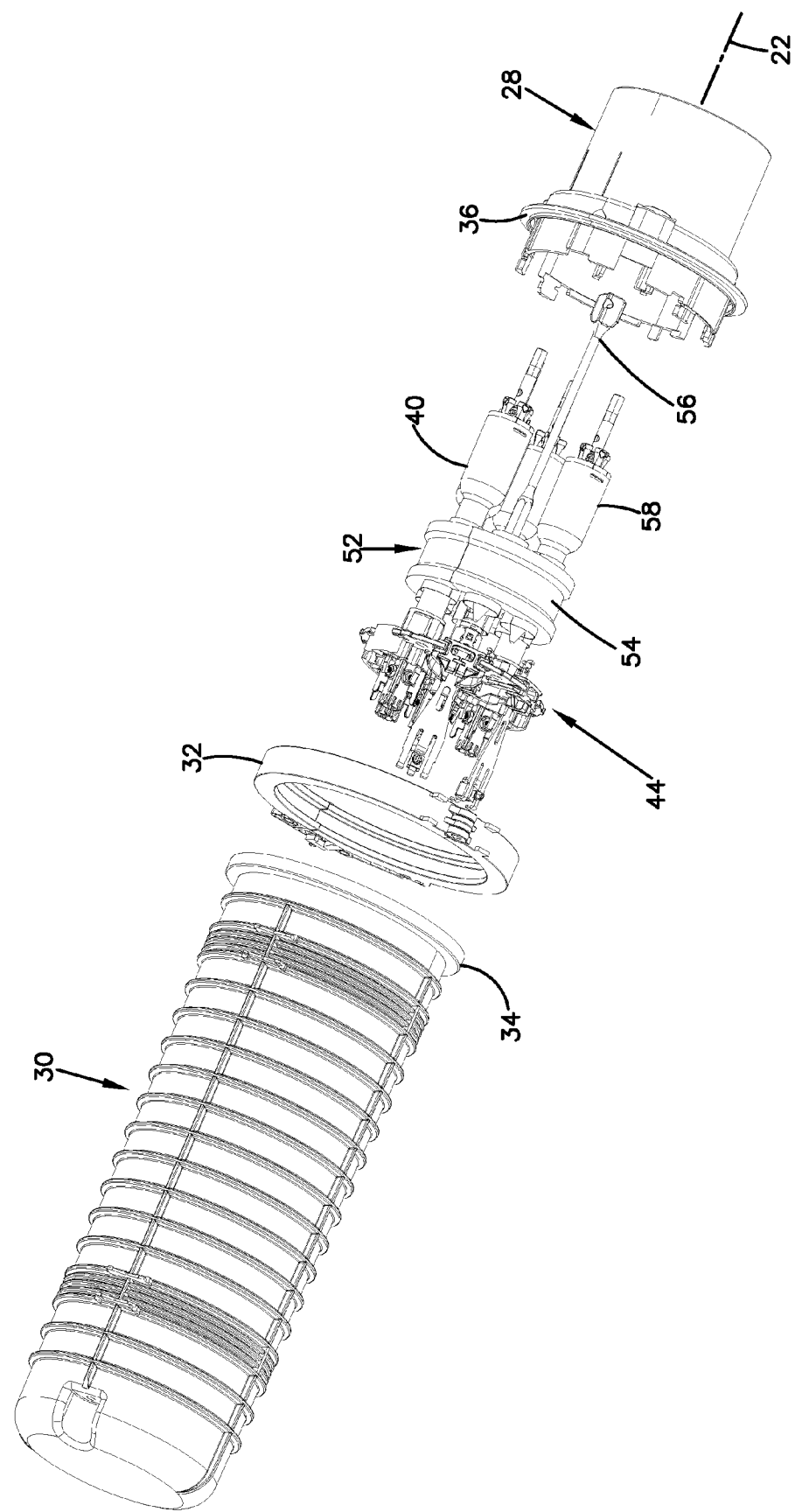
FIG. 4 is an exploded, perspective view of the enclosure of FIG. 1.
Figure 4A:
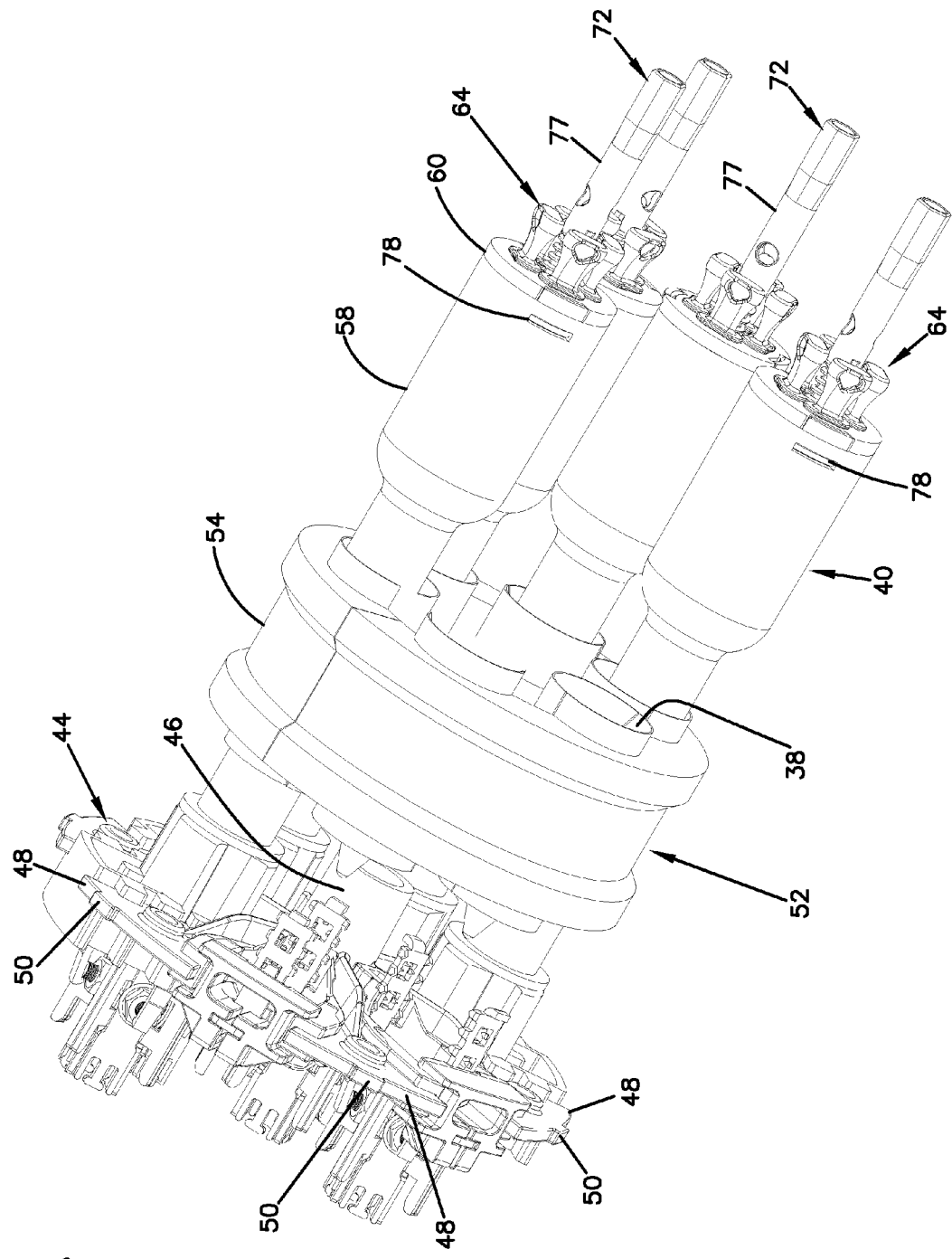
FIG. 4A is an enlarged view of a first portion of FIG. 4.

A plurality of primary cable through-ports 38 extend through the base 28 for allowing cables (e.g., trunk cables, drop cables, or other cables) to enter the enclosure 20 (see FIG. 4A). To accommodate drop cables or other smaller cables (i.e., secondary cables), secondary cable tube assemblies 40 are mounted in some of the primary cable through-ports 38 (see FIGS. 3 and 4A). The remainder of the primary cable through-ports 38 is shown receiving plugs 42 used to seal the unoccupied primary cable through-ports 36 (see FIG. 3). It will be appreciated that the plugs 42 can have elastic heads/features as described elsewhere herein to assist in relating the plugs 42 in the primary cable through-ports 38. When it is desired to install a main cable through one of the primary cable through-ports 38, the plug 42 corresponding to the given primary cable through-port 38 is removed so that the main cable can be inserted through the primary cable through-port 38. Similarly, if it is desired to route one or more drop cables or other secondary cables through an additional one of the primary cable through-ports 38, the plug 42 corresponding to the primary cable through-port 38 can be removed and replaced with another one of the secondary cable tube assemblies 40.

Referring to FIGS. 4-4A, the enclosure 20 includes a main bracket 44 (e.g., a "star" bracket) that mounts to the base 28. The main bracket 44 includes a central region 46 and a plurality of arms 48 that project radially outwardly from the central region 46 (FIG. 4A). When the main bracket 44 is mounted within the base 28, the anti-rotation tabs 50 fit within corresponding grooves defined by the base 28 to limit relative rotation between the base 28 and the main bracket 44 about the central longitudinal axis 22. A clamp or other locking mechanism can be used to secure the main bracket 44 within the base 28 and to limit axial movement between the main bracket 44 and the base 28. In certain embodiments, the main bracket 44 can function as a foundation for supporting additional framework that extends into the dome 30. It will be appreciated that optical components, such as optical splitters, splice trays, wavelength division multiplexers, fiber storage trays or other components, can be supported on the framework within the dome 30.

The enclosure 20 also includes a primary sealant assembly 52 that mounts within the base 28 (see FIG. 6A). The primary sealant assembly 52 includes a primary volume of sealant 54 (e.g., a sealing material such as gel, rubber) that defines the plurality of primary cable through-ports 38. The primary cable through-ports 38 pass through the primary sealant assembly 52 to provide sealed cable access to the interior of the enclosure 20. The primary sealant assembly 52 further includes a primary actuator 56 (FIG. 4) for pressurizing the primary volume of sealant 54. In certain embodiments, the primary actuator 56 uses a threaded mechanical mechanism to pressurize the primary volume of sealant 54 in an axial direction.

It will be appreciated that the primary sealant assembly 52 has a wrap-around configuration that can be laterally opened when the primary sealant assembly 52 has been removed from the base 28 so as to allow structures (e.g., plugs 42, secondary cable tube assemblies 40, or primary cables) to be inserted into the primary cable through-ports 38 in radial/lateral directions relative to the central longitudinal axis 22. In this way, it is not necessary to insert such structures in an axial direction through the primary cable through-ports 38.

Axial pressurization of the primary volume of sealant 54 forces the primary volume of sealant 54 to deform radially outwardly to provide a circumferential seal against an interior surface of the base 28. Concurrently, pressurization of the primary volume of sealant 54 causes the primary cable through-ports 38 to constrict in diameter. In this way, the primary volume of sealant 54 presses against and conforms to the outer shape of whatever structure is mounted through the primary cable through-ports 38 (e.g., a primary cable, a plug, or a secondary cable tube assembly 40). In this way, the primary volume of sealant 54 forms circumferential seals around the structures received within the primary cable through-ports 38.

Referring to FIGS. 4, 4A and 5-6, each of the secondary cable tube assemblies 40 includes a secondary cable tube 58 having a first end 60 and an opposite second end 62. The secondary cable tube assembly 40 also includes a port plug 64 located within a secondary cable sealant assembly 66. The port plug 64 is illustrated and described in more detail with reference to FIG. 7.

Figure 5:
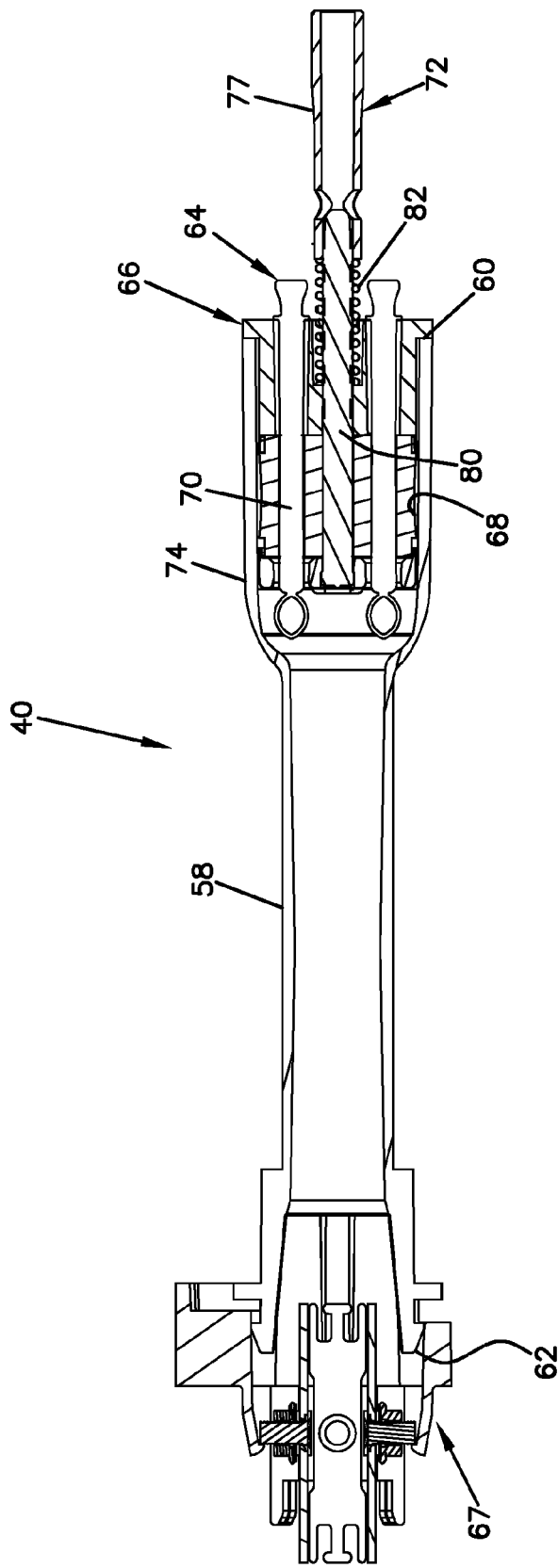
FIG. 5 is a longitudinal cross-sectional view of the secondary cable tube assembly of FIG. 4A.

The secondary cable sealant assembly 66 mounts within the first end 60 of the secondary cable tube 58 and a secondary cable anchoring assembly 67 mounts at the second end 62 of the secondary cable tube 58 (see FIG. 5). When the secondary cable tube 58 is secured within one of the primary cable through-ports 38, the first end 60 of the secondary cable tube 58 is located outside the enclosure 20 and the second end 62 of the secondary cable tube 58 is located inside the enclosure 20 (see FIG. 4). The primary volume of sealant 54 presses against and conforms to the outer shape of the secondary cable tube 58 to form the circumferential seal.

Figure 6:
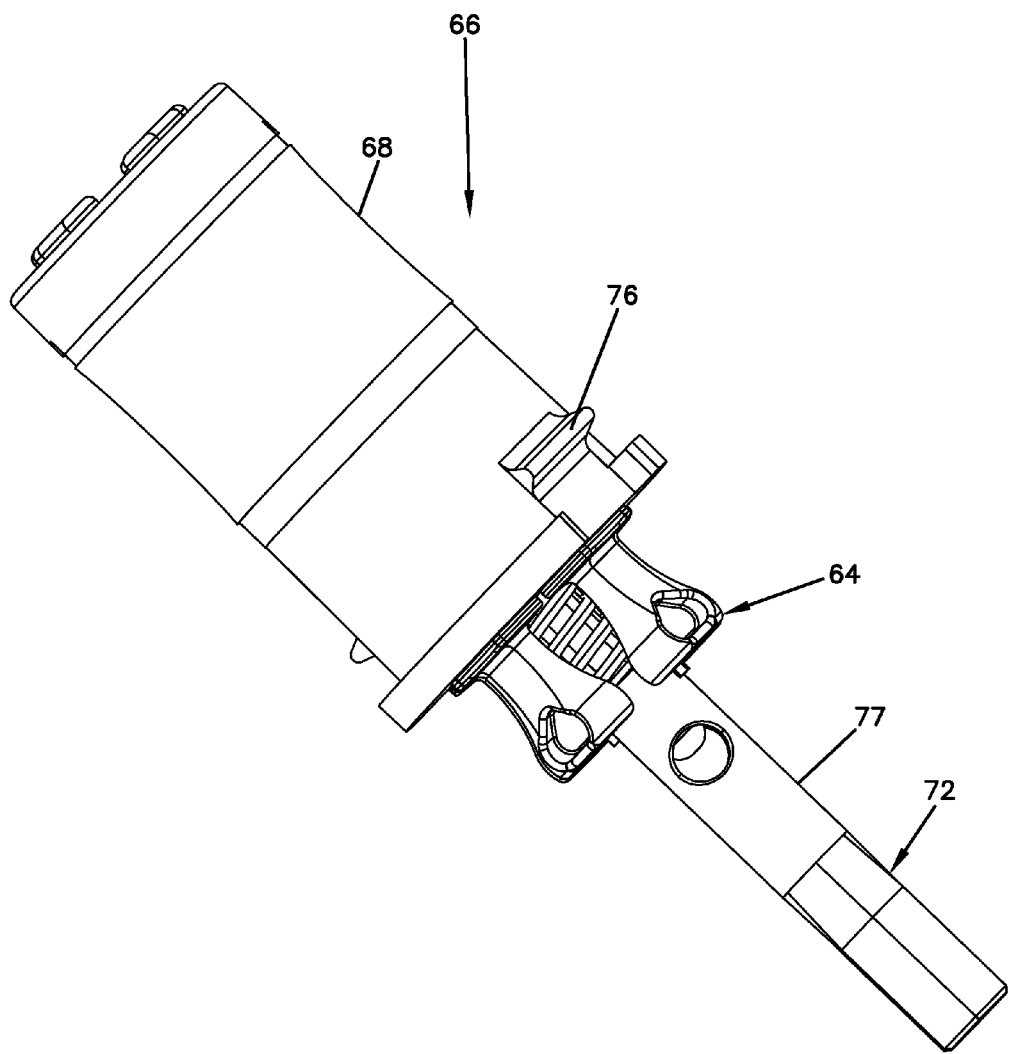
FIG. 6 is a secondary cable sealant assembly that is used in the secondary cable tube assembly of FIG. 4A.

Referring to FIGS. 5-6, the secondary cable sealant assembly 66 includes a secondary sealant volume 68 (e.g., sealing gel) defining a plurality of secondary cable through-ports 70 (e.g., drop cable ports) that extend through the secondary cable sealant assembly 66. The secondary cable through-ports 70 may be oval, round, or another shape. The secondary cable sealant assembly 66 also includes a secondary actuator 72 for pressurizing the secondary sealant volume 68. The secondary cable tube 58 has an enlarged diameter portion 74 positioned at the first end 60. The enlarged diameter portion 74 is configured for receiving the secondary cable sealant assembly 66. When the secondary cable sealant assembly 66 is inserted into the enlarged diameter portion 74, tabs 76 (FIG. 6) of the secondary cable sealant assembly 66 snap within corresponding openings 78 (FIG. 4A) of the secondary cable tube 58 so as to assist in axially retaining the secondary cable sealant assembly 66 within the secondary cable tube 58 and to resist rotation between the secondary cable tube 58 and the secondary cable sealant assembly 66.

Once the secondary cable sealant assembly 66 has been inserted within the secondary cable tube 58, the secondary actuator 72 can be used to pressurize the secondary sealant volume 68. When the secondary sealant volume 68 is pressurized, the secondary sealant volume 68 is forced to deform radially outwardly so as to form a circumferential seal against the interior surface of the secondary cable tube 58. Concurrently, the secondary sealant volume 68 deforms radially inwardly so as to constrict the sizes of the secondary cable through-ports 70. In this way, the secondary sealant volume 68 is adapted to form seals around any structures (e.g., plugs, secondary cables, etc.) inserted through the secondary cable through-ports 70. In the depicted embodiment, the secondary actuator 72 is actuated by a threading handle 77 on a shaft 80 (see FIG. 5). As the threading handle 77 is threaded onto the shaft 80, a spring 82 is compressed thereby applying a compressive load to the secondary sealant volume 68 which axially pressurizes the secondary sealant volume 68 (see FIG. 5). It will be appreciated that the primary actuator 56 can operate in a similar manner.

Figure 7:
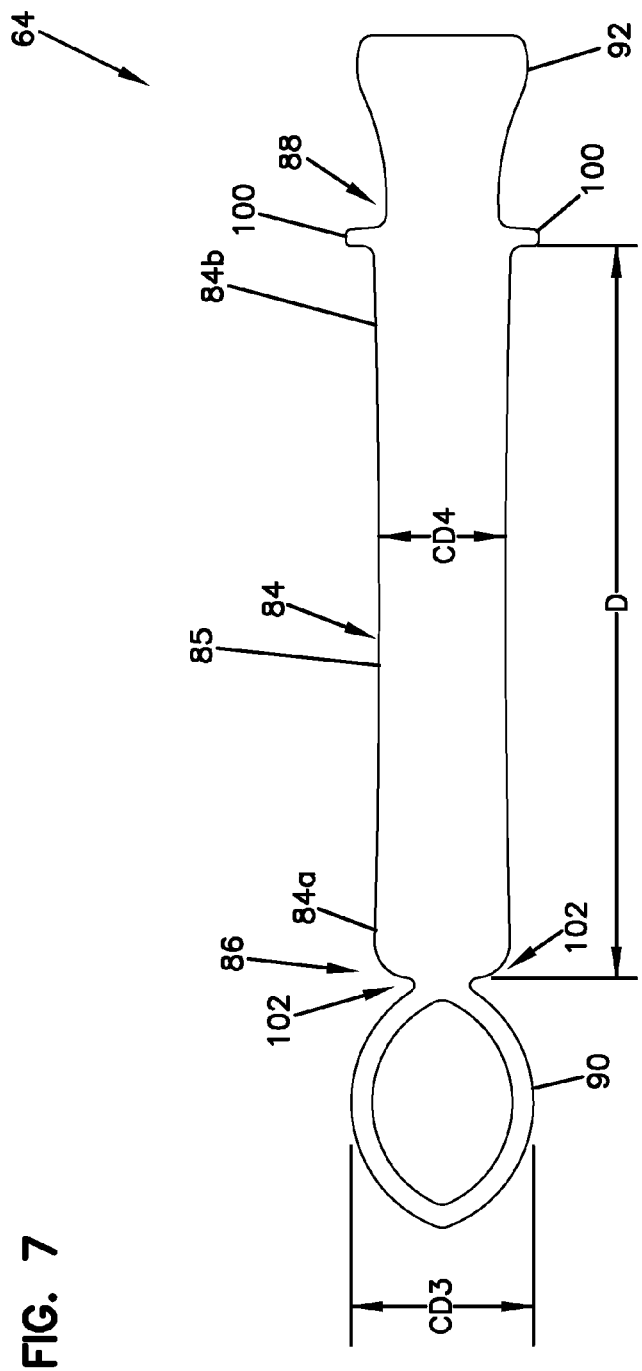
FIG. 7 is a perspective view of a port plug of FIG. 5.
Figure 8A:
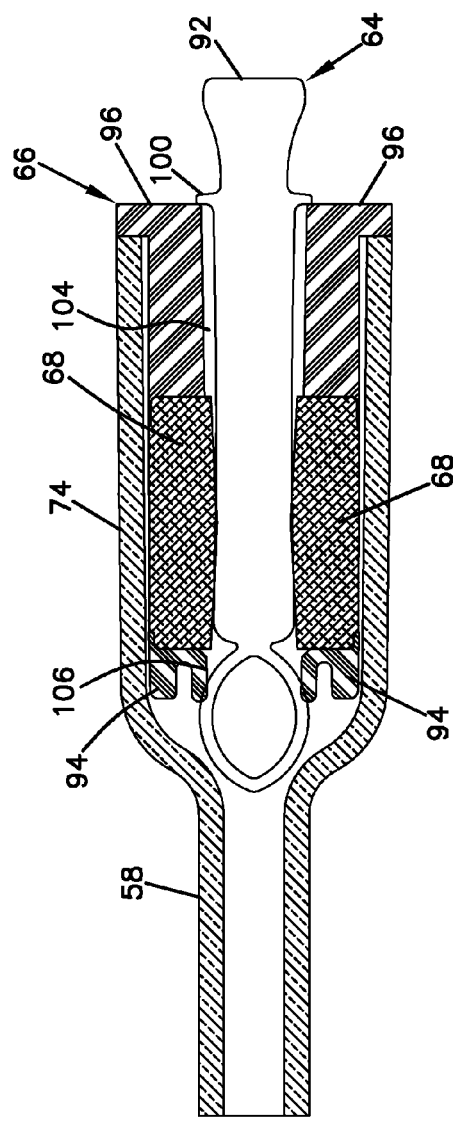
FIG. 8A is a longitudinal cross-sectional view showing the port plug fully inserted in a secondary cable through-port in accordance with the principles of the present disclosure.
Figure 8B:
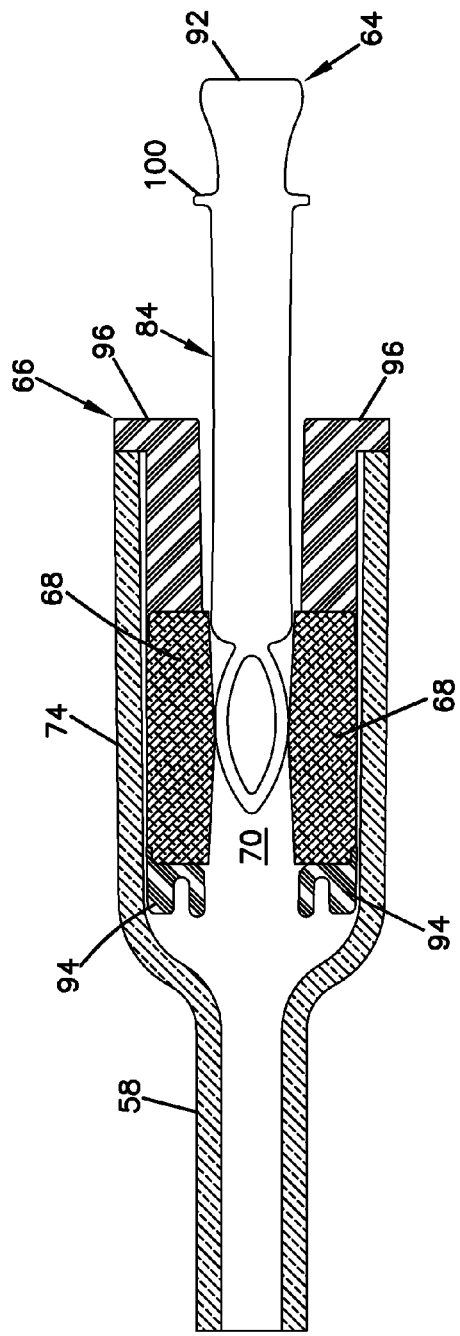
FIG. 8B is a longitudinal cross-sectional view of FIG. 8A showing the port plug inserted half-way within the secondary cable through-port.
Figure 8C:
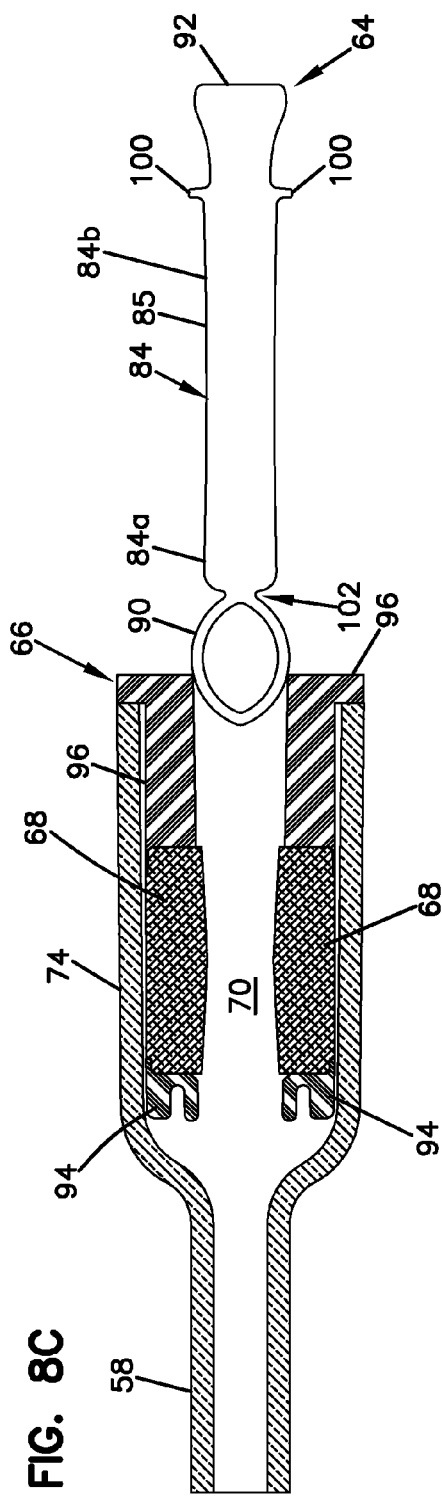
FIG. 8C is a longitudinal cross-sectional view of FIG. 8A showing the port plug partially inserted in the secondary cable through-port.
Figure 8D:
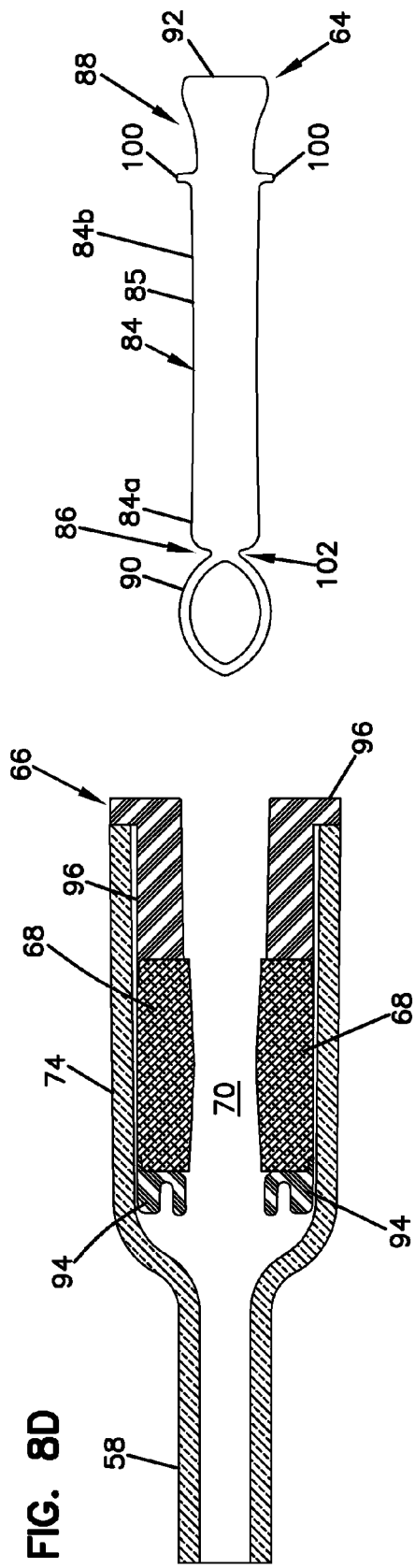
FIG. 8D is a longitudinal cross-sectional view of FIG. 8A showing the port plug outside of the secondary cable through-port.

Referring to FIG. 7, an example of a port plug 64 is shown. The port plug 64 has a main body 84, an internal end 86, and an external end 88. The internal end 86 of the port plug 64 defines a tip 90 and the external end 88 of the port plug 64 defines a handle 92. In this example, the main body 84 is integrated with, or coupled to, the tip 90, and the handle 92 to form one-piece unit or unitary port plug 64. The tip 90 has elastic characteristics that allow the tip 90 to collapse radially when axial force is applied to the port plug 64 for removal or insertion into the secondary cable through-port 70 (see FIGS. 8A-8D). The spring action of the tip 90 may be achieved in other ways. Other embodiments may include a spring (not shown) attached to the tip 90 such that the port plug 64 is not integrated with the spring. The port plug 64 may be made of plastic (e.g., polymer), metal or other material with elastic characteristics. In an example, the main body 84 may have a length defining a distance D. The main body 84 may have a tapered body or a straight body (i.e. non-tapered). As depicted, the main body 84 has sections 84a, 84b that taper inwardly in transverse cross-sectional area as the sections 84a, 84b extend toward a middle region 85 of the main body 84. Thus, the middle region 85 has a reduced cross-sectional area as compared to end regions of the main body 84. The transverse cross-sectional profile of the main body 84 can have a shape that matches the shape of the cable through-ports 70 (e.g., round, oval, obround, etc.).

As shown in FIGS. 8A-8D, the secondary actuator 72 includes an inner compression plate 94 and an outer compression plate 96 between which the secondary sealant volume 68 is positioned. It is to be understood that other materials may include another type of seal material. In use, the port plug 64 can be inserted into the of the secondary cable through-ports 70 of the secondary cable sealant assembly 66 with minimal force. While being inserted, the tip 90 of the port plug 64 compresses radially inwardly as it is pushed axially through the secondary cable through-port 70 so that it can pass through the secondary sealant volume 68 and the inner and outer compression plates 94, 96. Once the port plug 64 is past the inner compression plate 94, the tip 90 of the port plug 64 automatically expands back radially open due to its inherent elasticity property. The port plug 64 is configured to have enough resistance such that the port plug 64 does not push out of the secondary cable through-port 70 after actuation of the secondary actuator 72.

In one example, the port plug 64 includes a flange 100 near the external end 88 of main body 84. The flange 100 of the port plug 64 abuts the outer compression plate 96 when the port plug 64 is positioned inside the secondary cable through-port 70. The main body 84 of the port plug 64 may include a shoulder 102 at the internal end 86 of the main body 84. The distance from the flange 100 to the shoulder 102 of the port plug 64 equals distance D and is preferably selected to be sufficiently long for the flange 100 to be outside the outer plate 96 and the majority of the tip 90 to be inward of the compression plate 94. The distance D can be sized taking into consideration the maximum spacing that may exists between the compression plates 94, 96. In one example, there may be four port plugs 64 in the secondary cable tube assembly 40. When the secondary actuator 72 is actuated, the secondary sealant volume 68 conforms to the outer shapes of the main bodies 84 of the port plugs 64 to form seals thereabout.

FIGS. 8A-8D show an example of the port plug 64 being extracted from the secondary cable through-port 70 of the secondary cable tube 58. To extract the port plug 64, the secondary actuator 72 is de-actuated and the port plug 64 is pulled axially from its corresponding part by grasping the handle 92 and pulling the port plug 64 from the port. It is not necessary to detach the dome 30 from the base 28 to remove the port plug 64 from its corresponding port.

FIGS. 9-13 show examples of other embodiments of a port plug in accordance with the disclosure. It is to be understood that other configurations of port plugs may be used in accordance with the principles of the disclosure.

Referring to FIG. 9, another embodiment is shown for a port plug 164 including a tip 190. The tip 190 has a main portion 191 that curves outwardly to define a cross-dimension CD1. The main portion defines two flexible legs 192 that each includes a fixed end 193 and a free end 194. The free end 194 of each of the flexible legs 192 has a curve transition that flair in a direction away from each other to define an open end 195.

Referring to FIG. 10, another embodiment is shown for a port plug 264 including a tip 290. In this example, the tip 290 includes an integral support member 292 that has a zigzag construction for providing additional spring force.

Referring to FIG. 11, another embodiment of a port plug 364 is shown including a tip 390. The tip 390 includes an integral central member 392 having a fixed end 394 and an open end 396. The fixed end 394 has two flexible legs 398 that curve out about the central member 392.

Referring to FIG. 12, another embodiment of a port plug 464 is shown including a tip 490. The tip 490 includes an integral central member 492 having a fixed end 494 and a closed end 496. The fixed end 494 has two flexible legs 498 that each curve out about the central member 492 and become linear at the closed end 496 to contact the central member 492.

Referring to FIG. 13, another embodiment of a port plug 564 is shown including a tip 590. The tip 590 has a main portion 592 that curves out to define cross-dimension CD2. The main portion 592 of the tip 590 includes an integral leg 594 with a fixed end 596 and a free end 598. The leg 594 is configured to curve out such that the free end 598 curves around to the fixed end 596.

In use, the enclosure 20 is configured such that a secondary cable such as a drop cable can be added to the enclosure 20 without having to de-pressurize the primary sealant assembly 52. To add a secondary cable, a field technician removes the clamp 32 and disengages the dome 30 from the base 28. The technician then de-pressurizes the secondary sealant volume 68 corresponding to the secondary cable sealant assembly 66 through which the secondary cable is intended to be routed. Once the secondary sealant volume 68 has been de-pressurized, a port plug 64 corresponding to one of the secondary cable through-ports 70 is removed and the secondary cable is inserted axially through the secondary cable through-port 70. The secondary cable is pushed through the secondary cable tube 58 to provide a sufficient length of cable within the enclosure 20 for subsequent processing. Next, the jacket of the cable is stripped and the optical fiber is accessed for splicing or connectorization. One of the secondary cable anchoring brackets is then removed from its corresponding secondary cable anchoring housing and a jacketed portion of the cable is secured (e.g., tied down) to the bracket. Subsequently, a strength member of the cable is accessed and clamped to the secondary cable anchoring bracket by the clamping structure. Once the cable has been effectively anchored to the secondary cable anchoring bracket, the secondary cable anchoring bracket is snapped back into its corresponding bracket mounting location and retained in place by the resilient latch corresponding to the mounting location. Thereafter, the secondary sealant volume 68 is re-pressurized and the dome 30 is re-attached to the base 28.

In other examples, plugs with elastic characteristics of the type described above can be used to seal the primary cable through-ports 38 when the primary cable through-ports 38 are not occupied by cables.

Referring again to FIG. 7, the tip 90 of the port plug 64 can be referred to as a retention feature. The tip 90 is movable between an expanded configuration (see FIGS. 7, 8A, and 8D) and a radially compressed configuration (see FIG. 8B). As the tip 90 is pushed/pulled axially through the secondary cable through-port 70, the secondary sealant volume 68 presses against the tip 90 causing the tip 90 to move to the radially compressed configuration to allow passage of the tip 90 through the secondary cable through-port 70. After the tip 90 passes through the secondary cable through-port 70, the inherent elastic construction/characteristic of the tip 90 causes the tip 90 to automatically move to the expanded configuration. In the expanded configuration, the tip 90 has a cross-dimension CD3 that is larger than a cross-dimension CD4 of the main body 84. The size and shape of the tip 90 are selected such that the tip 90 can effectively retain the port plug 64 in its corresponding port when the port is sealed, while allowing the port plug 64 to be manually pulled from the port when the secondary actuator 72 is de-actuated. In the depicted example, the tip 90 is more resilient or more easily compressible than the main body 84 and the cross-dimension CD3 is at least 5, 10, or 15 percent larger than the cross-dimension CD4. The tip 90 can be tapered/transitioned at its ends to facilitate radially compressing the tip 90 as the tip 90 is pushed or pulled through its corresponding cable port.

From the foregoing detailed description, it will be evident that modifications and variations can be made in the devices of the disclosure without departing from the spirit or scope of the invention.

What is claimed is:

1. An enclosure comprising:
 an outer housing;
 a sealant assembly defining a cable port for routing a cable into the outer housing; and
 a plastic port plug with a handle, the plastic port plug having an outer end and an inner end, the plastic port plug including a retention feature positioned at the inner end of the plastic port and a main body extending between the handle and the retention feature, the handle and the retention feature being integral with the main body, the plastic port plug passing through the cable port, the retention feature being moveable between an expanded configuration and a radially compressed configuration, the retention feature having an elastic construction allowing the retention feature to move to the radially compressed configuration while passing through the cable port and causing the retention feature to automatically expand to the expanded configuration after passing through the cable port;

wherein the retention feature is more resilient than the main body.

2. The enclosure of claim 1, wherein the retention feature has a cross-dimension when in the expanded configuration that is at least 5 percent larger than a corresponding cross-dimension of the main body.

3. An enclosure comprising:
a primary sealant assembly including a primary volume of sealant that defines a plurality of primary cable through-ports passing through the primary sealant assembly,
a secondary cable tube that mounts within one of the primary cable through-ports, the secondary cable tube including a first end and a second end;
a secondary cable sealant assembly including a secondary sealant volume defining a plurality of secondary cable through-ports that extend through the secondary cable sealant assembly; and
a plastic port plug with a handle, the plastic port plug having an outer end and an inner end, the plastic port plug including a retention feature positioned at the inner end of the plastic port plug and a main body extending between the handle and the retention feature, the handle and the retention feature being integral with the main body, the plastic port plug passing through the secondary cable through-ports, the retention feature being moveable between an expanded configuration and a radially compressed configuration, the retention feature having an elastic construction allowing the retention feature to move to the radially compressed configuration while passing through the secondary cable through-ports and causing the retention feature to automatically expand to the expanded configuration after passing through the secondary cable through-ports;
wherein the retention feature is more resilient than the main body.

4. The enclosure of claim 3, wherein the secondary cable sealant assembly further including a secondary actuator for pressurizing the secondary sealant volume.

5. The enclosure of claim 3, wherein the secondary cable sealant assembly further comprises an inner compression plate and an outer compression plate between which the secondary sealing volume is positioned.

6. An enclosure comprising:
a housing including a dome having an open end and a base that is secured to the open end of the dome;
a primary sealant assembly including a primary volume of sealant that defines a plurality of primary through-ports that pass through the primary sealant assembly, the primary sealant assembly including a primary actuator for pressurizing the primary volume of sealant;
a secondary cable tube assembly including a secondary cable tube having a first end and an opposite second end, the first end of the secondary cable tube being positioned outside the housing when the secondary cable tube is mounted within the primary cable through-port, the second end of the secondary cable tube being positioned inside the housing when the secondary cable tube is mounted within the primary cable through-port;
a secondary cable sealant assembly that mounts within the first end of the secondary cable tube, and a secondary cable anchoring assembly that mounts at the second end of the secondary cable tube, the secondary cable sealant assembly including a secondary sealant volume defining a plurality of secondary cable through-ports that extend through the secondary cable sealant assembly to provide sealed secondary cable access to the interior of the housing, the secondary cable sealant assembly also including a secondary actuator for pressurizing the secondary sealant volume;
an inner compression plate and an outer compression plate between which the secondary sealing volume is positioned; and
a plastic port plug with a handle, the plastic port plug having an outer end and an inner end, the plastic port plug including a retention feature positioned at the inner end of the plastic port plug and a main body extending between the handle and the retention feature, the handle and the retention feature being integral with the main body, the plastic port plug passing through the secondary cable through-ports, the retention feature being moveable between an expanded configuration and a radially compressed configuration, the retention feature having an elastic construction allowing the retention feature to move to the radially compressed configuration while passing through the secondary cable through-ports and causing the retention feature to automatically expand to the expanded configuration after passing through the secondary cable through-ports;
wherein the retention feature is more resilient than the main body.

7. The enclosure of claim 6, wherein the secondary sealant volume is gel.

8. The enclosure of claim 6, wherein the secondary sealant volume is a rubber.

9. A plastic port plug comprising:
a main body having an internal end and an opposite external end;
a head located at the internal end of the main body, the head having elastic characteristics such that the head of the plastic port plug compresses when pulled or pushed axially through a secondary cable through-port, the head of the plastic port plug automatically expands back open due to the elasticity property when removed or fully inserted in the secondary cable through-port;
the external end of the plastic port plug has a handle;
wherein the main body of the plastic port plug is integrated with the head and the handle to form a unitary piece; and
wherein the head is more elastic than the main body.

* * * * *